US009441951B1

(12) United States Patent
Vitaladevuni et al.

(10) Patent No.: US 9,441,951 B1
(45) Date of Patent: Sep. 13, 2016

(54) DOCUMENTING TEST ROOM CONFIGURATIONS

(71) Applicant: Amazon Technologies, Inc., Seattle, WA (US)

(72) Inventors: Shiv Naga Prasad Vitaladevuni, Cambridge, MA (US); Janet Louise Slifka, Cambridge, MA (US); Rohit Prasad, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 103 days.

(21) Appl. No.: 14/089,540

(22) Filed: Nov. 25, 2013

(51) Int. Cl.
*G01B 11/00* (2006.01)

(52) U.S. Cl.
CPC .................... *G01B 11/002* (2013.01)

(58) Field of Classification Search
CPC ...... G01C 15/00; G01C 15/02; G01C 11/00; G01C 11/26
USPC ............................................ 33/1 C, DIG. 21
See application file for complete search history.

(56) References Cited

U.S. PATENT DOCUMENTS

| | | | | |
|---|---|---|---|---|
| 4,383,373 A * | 5/1983 | Couturier | ............. | G01B 5/0025 33/1 CC |
| 5,872,657 A * | 2/1999 | Rando | .................. | G02B 27/648 33/286 |
| 5,920,394 A * | 7/1999 | Gelbart | .................. | G01S 17/66 356/615 |
| 6,202,312 B1 * | 3/2001 | Rando | .................. | G01C 15/004 33/227 |
| 6,256,895 B1 * | 7/2001 | Akers | .................. | G01C 15/004 33/286 |
| 6,594,910 B2 * | 7/2003 | Wishart | .............. | E04G 21/1808 33/281 |
| 7,003,890 B2 * | 2/2006 | Kavounas | ........... | E04F 21/1844 33/286 |
| 7,165,332 B2 * | 1/2007 | McGrail | .............. | A63D 15/005 33/227 |
| 7,418,392 B1 | 8/2008 | Mozer et al. | | |
| 7,614,154 B2 * | 11/2009 | Cobb | .................... | B64F 5/0009 33/1 BB |
| 7,720,683 B1 | 5/2010 | Vermeulen et al. | | |
| 7,774,204 B2 | 8/2010 | Mozer et al. | | |
| 7,866,052 B2 * | 1/2011 | Schulze | ................. | G01C 15/02 33/1 G |
| 8,220,167 B2 * | 7/2012 | Swanson | ................. | E04F 21/00 33/1 G |
| 8,336,217 B2 * | 12/2012 | Yi | .......................... | G01C 15/02 33/228 |
| 8,745,884 B2 * | 6/2014 | Hayes | ................. | G01C 15/004 33/1 G |
| 2005/0228613 A1 * | 10/2005 | Fullerton | .............. | G01S 5/0289 342/458 |
| 2012/0223885 A1 | 9/2012 | Perez | | |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Yaritza Guadalupe-McCall
(74) *Attorney, Agent, or Firm* — Lee & Hayes, PLLC

(57) ABSTRACT

Techniques are described for documenting the positions of items in a room, such as in rooms that are configured for testing automated systems that perform position-related functions. A non-contact measuring tool may be placed at different reference positions within the room. At each position, measurements are made to the room corners and to items of interest within the room. Based on this information, coordinates of the reference positions are calculated. Coordinates of the items are calculated based on the determined coordinates of the reference positions.

20 Claims, 2 Drawing Sheets

DOCUMENTING TEST ROOM CONFIGURATIONS

BACKGROUND

User interfaces have traditionally relied on physical devices such as keyboards and electronic displays. Increasingly, however, it is desired to interact with users through more natural means such as speech and gestures. In addition, systems may be configured to display information on passive surfaces such as walls or other surfaces within a user environment.

When developing automated systems such as this, testing may be performed in controlled environments. When performing such testing, it may be important to have an accurate physical representation of the environment. For example, it may be important to know the dimensions of a room and the positions of loudspeakers, microphones, projection components, cameras, sensors, human listeners, human speakers, and various other physical elements.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described below are techniques for efficiently documenting the positions of items within a room that is to be used for testing an automated system. Items of interest may include human listeners, human speakers, loudspeakers, microphones, projectors, cameras, sensors, devices, and other objects.

In one embodiment, the room is assumed to have intersecting walls and a ceiling. The described techniques utilize a non-contact, line-of-sight measuring tool such as a laser measurement tool, which may be mounted on a tripod at several locations within the room and aimed in different directions to measure distances between the tool and surfaces at which the tool is aimed.

Multiple corners of the room, such as formed by the intersection of the ceiling and two walls, are identified and used to form a coordinate system. Multiple reference positions within the room are also selected.

The laser measurement tool is positioned at a first of the reference positions. From this location, distance measurements are made to each of the room corners and to each item of interest within the room. The laser measurement tool is then positioned at a second of the reference positions, and distance measurements are repeated for each of the room corners and each item of interest. This process is repeated at each of the reference positions. In addition, the laser measurement tool is used to measure the height, relative to the ceiling, of the reference positions and the items of interest.

The distances measured in this manner are then used to determine the positions of the items of interest relative to the room corners. First, mathematical triangulation is used to determine the coordinates of the reference positions within the coordinate system formed by the room corners. Second, mathematical triangulation is used to determine the coordinates of the items of interest relative to the reference positions.

Figure 1:
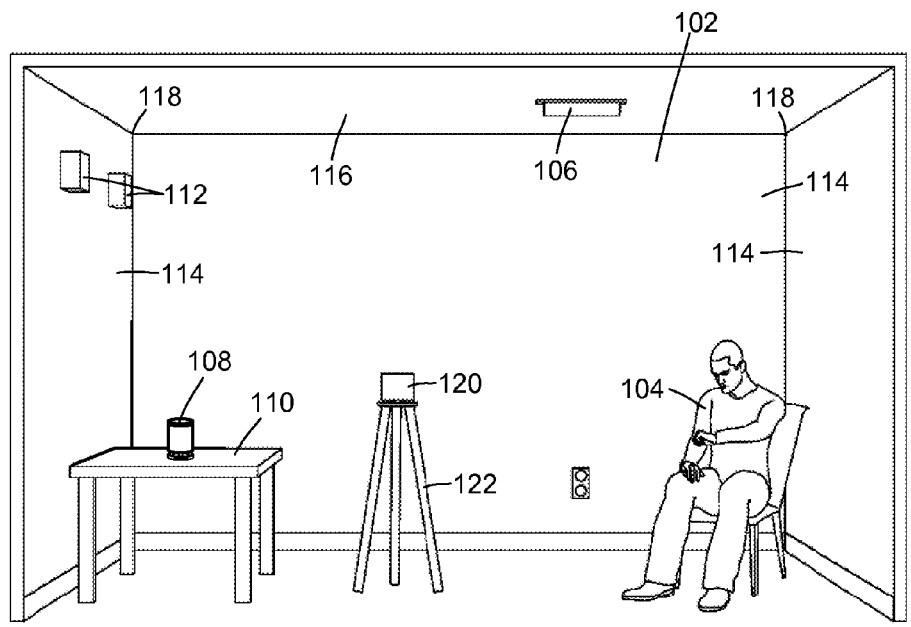
FIG. 1 illustrates an environment that is to be documented for testing automated systems.

FIG. 1 shows an example environment in which the described techniques may be used. The environment comprises a room 102 containing multiple items or objects of interest, which may include human listeners, human speakers, loudspeakers, microphones, projectors, cameras, sensors, devices, and other objects within the room or environment. As examples, FIG. 1 shows a human user 104, who may act as a listener and/or a speaker. The room 102 also contains electronic devices 106 and 108, which may comprise any number of different devices or systems for interacting with users.

The device 106, for example, may comprise an automated system for providing various types of content to the user 104 such as video, audio, speech, etc. The device 106 may include various components that may be used to detect and evaluate conditions and events within the room 102. As examples, the device 106 may include one or more projectors, one or more cameras, multiple microphones, one or more speakers, and various other types of sensors and transducers, content generation devices, and so forth.

A projector of the device 106 may be used to project content onto surfaces of the room 102 for viewing by the user 104. The device 106 may also have various cameras and other sensors that may be used to analyze objects within the room 102 and which may be used for 3D reconstruction and modeling of the room. The device may be capable of determining the location of the user 104, detecting user gestures, determining the positions of objects within the room 102, reconstructing 3D characteristics of the room and objects within the room, and so forth.

The device 106 may also have microphones or microphone arrays for acquiring input from the user 104. Microphones may be used in conjunction with time-delay-of-arrival (TDOA) techniques, audio beamforming techniques, or other techniques to determine the locations of sounds originating from within the room 102. The microphones may be used by speech recognition components, allowing the device 106 to respond to spoken user commands.

The device 106 may have speakers to provide audible output. For example, the speakers may be used to provide output from a text-to-speech module or to play pre-recorded audio.

The device 108 may have any one or more of the components described above, such as cameras, speakers, sensors, and so forth, and may be used to interact with the user 104. The device 108 may be configured to detect the position of the user 104 and to detect user speech and user gestures. The device 108 may also be configured to project content for viewing by the user 104, such as by projecting content onto a tabletop 110.

The room 102 may also contain other elements used by an automated system, such as speakers 112. Other elements, not specifically shown, may include illumination sources, microphones, projectors, cameras, transducers, sensors, beacons, etc.

The configuration of the room itself may be defined by walls 114 and a ceiling 116. The walls and ceiling may form room corners 118, which may be used to establish a coordinate system within which items may be mapped.

Generally, components and elements of a system may be located or distributed in various locations within a room, and may act independently or in concert to interact with a user. For example, the user 104 may issue a command and the system may respond to the command by projecting, speaking, or taking some other action. The system may also interact with remote systems, such as through the Internet, to initiate service or obtain information on behalf of the user 104 in response to commands by the user. User commands may be by means of speech, gestures, interactions with surfaces or objects within the room 102, or through other means.

Various functions performed by the system may be dependent on relative positions of items within the room. For example, the system may use various techniques to determine the positions of users within the room 102. Actions taken by the system may be dependent upon such positions. Positions of users and objects may be determined by optical or audio analysis, and/or in conjunction with various types of sensors.

Similarly, system output may be dependent upon positions of items within the room 102. The system may project content onto a surface near the present location of the user 104, for example. As another example, sound may be directed or optimized for the current position of the user 104 or based on detected positions of other items within the room 102.

When designing a system such as this, it is desirable to perform testing in various environments in order to analyze and verify the accuracy with which the system performs location-dependent functions. When testing, each environment is carefully documented. Environment documentation may include the exact positions of items within the environment.

A measuring device or tool 120 may be used to determine relative positions of items within the room 102. In some embodiments, the measuring device 120 may comprise a laser measuring device that is configured to measure the distance from the tool to a surface at which the tool is aimed or pointed. The tool 120 may be mounted on a stand or tripod 122 in such a way that the tool 120 may be rotated and tilted to point at different targets. The tool 120 may also be placed at or on different items within the room to measure distances from the items to walls, ceilings, or corners of rooms. The tool 120 may use a laser beam and may measure reflected characteristics of the laser beam to determine distances.

Figure 2:
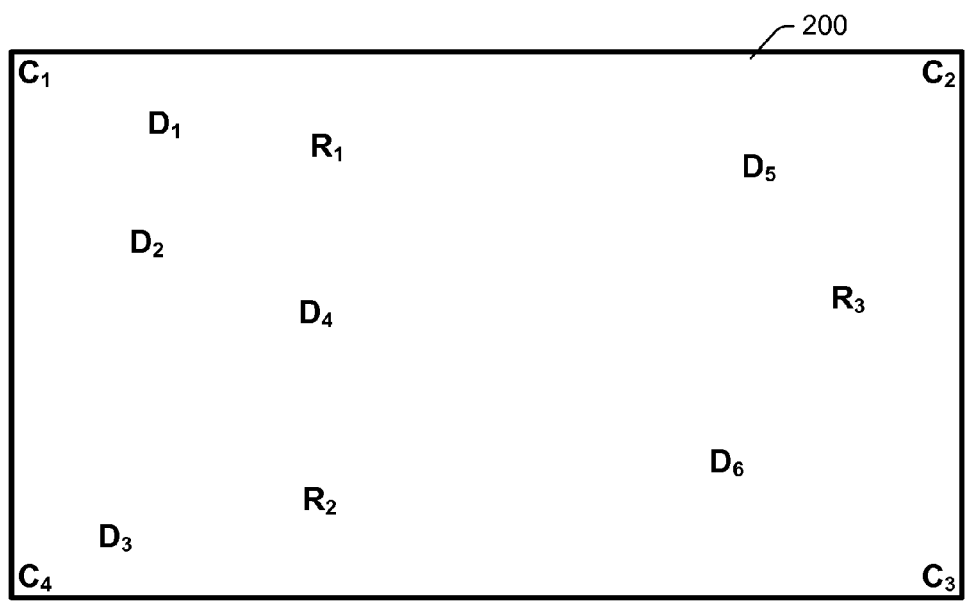
FIG. 2 is a top view of a room containing items whose positions are to be documented.

FIG. 2 shows an example configuration of a room 200. In this example, the room 200 is rectangular and has four corners that are labeled as $C_1$, $C_2$, $C_3$, and $C_4$, corresponding to vectors representing the x, y, and z coordinates of the corners. x and y represent orthogonal horizontal directions while z represents the vertical height or depth direction.

Each corner is formed by the intersection of two walls and the ceiling of the room. One of the corners, such as $C_1$, may be used as a coordinate origin for a coordinate system. Accordingly, the corner $C_1$ may be assigned x, y, z coordinates of [0,0,0]. The room is assumed to have a flat ceiling, meaning that the z coordinate of each corner is equal to zero, and the ceiling forms a vertical coordinate origin.

Items of interest and their positions within the room 200 are labeled as $D_1$, $D_2$, $D_3$, $D_4$, $D_5$ and $D_6$, corresponding to variables or vectors representing the x, y, z coordinates of the items. The items of interest may comprise various types of objects such as described above. The items may be at different heights relative to the ceiling of the room.

Figure 3:
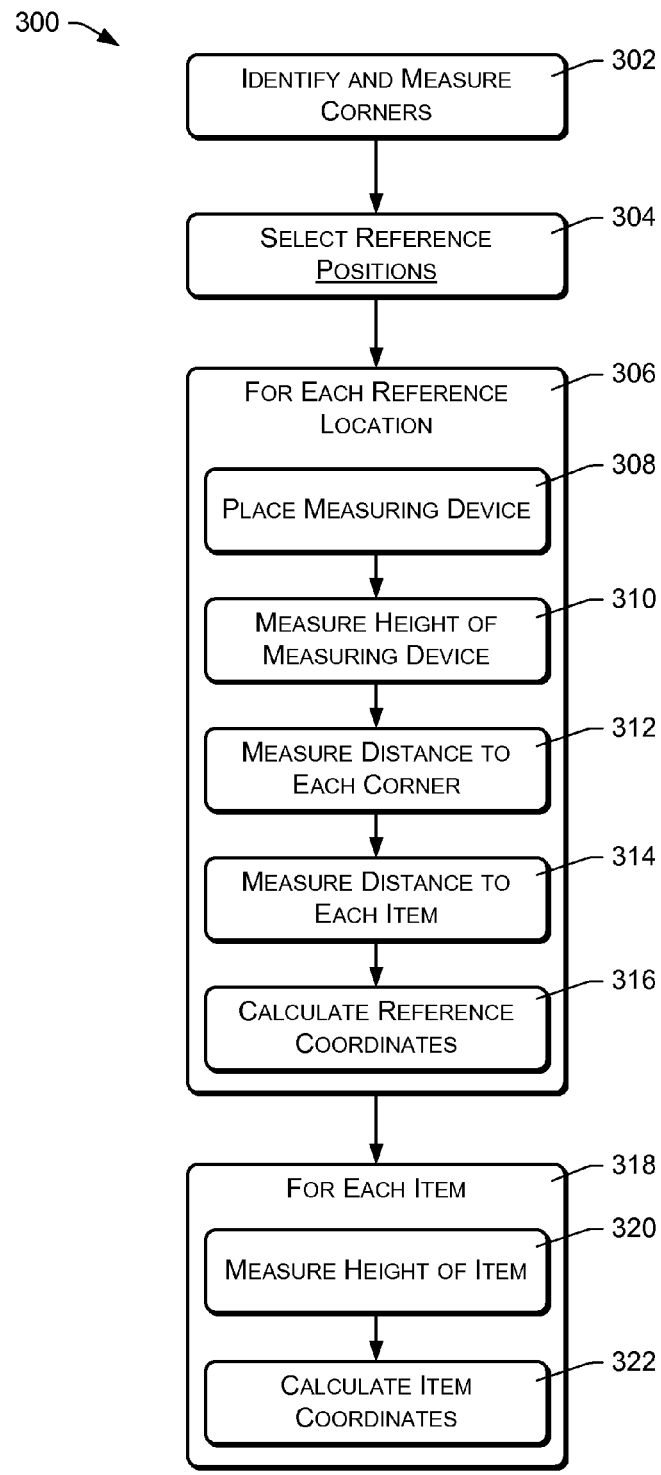
FIG. 3 is a flow diagram of an example process for documenting the positions of items within a room or other environment.

FIG. 3 illustrates a method 300 of obtaining position coordinates of multiple items or other targets within a room. The method 300 is discussed with reference to FIG. 2, although the method 300 may be used for determining item coordinates in rooms having various different shapes and configurations.

An action 302 comprises recording or documenting the configuration of multiple landmarks within the room 200. In the illustrated example, the landmarks are defined as the corners $C_1$, $C_2$, $C_3$, and $C_4$, although any other easily recognizable features may alternatively be used. The action 302 may comprise measuring the distances between neighboring corners and measuring the height of the ceiling to establish the x, y, z values of corners $C_1$, $C_2$, $C_3$, and $C_4$. The configuration of the room 200 may be measured using the laser measuring device 120 or using other means such as a measuring tape. Existing floor plans or other existing documentation may also be used to determine room configurations and measurements.

An action 304 comprises selecting multiple reference positions within the room 102. In many cases, three reference positions may be selected. Such reference positions are represented as $R_1$, $R_2$, and $R_3$ in FIG. 2, corresponding to variables or vectors representing the x, y, z coordinates of the reference positions. The values of such x, y, z coordinates may be at first unknown, and may be calculated in accordance with techniques described below.

A laser measuring device, such as the measurement tool 120 shown in FIG. 1, will be used and placed at the reference positions $R_1$, $R_2$, and $R_3$ to obtain distance measurements. The reference positions R are selected so as to allow room to walk and maneuver around the measuring device and its stand, with clear lines of sight to all or most of the items of interest D, at reasonable distances from each other, and arranged in a triangle rather than a line.

An action or set of actions 306 are then performed for and at each of the reference positions R. The actions 306 will be described as being performed at the $j^{th}$ reference position $R_j$.

An action 308 may be performed in some situations. The action 308 comprises placing the laser measuring device at the reference position $R_j$. An action 310 comprises measuring the height of the laser measuring device when positioned on its stand at the reference position $R_j$. The height of the laser measuring device may be measured by the laser measuring device itself in relation to the ceiling, which is defined as the vertical coordinate origin. In other words, this measurement may be performed by aiming the laser measuring device at the ceiling and measuring the distance from the laser measuring device to the ceiling. The measured distance forms the vertical or z coordinate of the reference position $R_j$, relative to the origin corner $C_1$. Although actual measurements of the vertical coordinates of the reference positions may improve accuracy, the vertical coordinates may alternatively be estimated or calculated in accordance with the action 316, below.

An action 312 comprises, for each landmark or corner $C_i$, aiming the laser measuring device at the corner $C_i$ from the reference position $R_j$ and measuring a reference-to-landmark or reference-to-corner distance $d_{ij}$ between the reference position $R_j$ and the corner $C_i$ with the laser measuring device. An action 314 comprises, for each item of interest $D_k$, aiming the laser measuring device at the item $D_k$ from the reference position $R_j$ and measuring a reference-to-item or reference-to-landmark distance $g_{jk}$ between the reference position $R_j$ and the item $D_k$ with the laser measuring device.

An action 316 comprises calculating and determining coordinates of the reference position $R_j$, relative to the landmarks identified in the action 302, which in this example comprise the corners C of the room 200. In certain embodiments, this may be performed by minimizing a first function of the corner coordinates C and the reference-to-corner distances $d_{ij}$. More specifically, the action 316 may be performed by finding a coordinate vector $R_j$ that minimizes the following function:

$$\sum_{i=1}^{N} \| \|C_i - R_j\|_{L2}^2 - d_{ij}^2 \|_{L1}$$

where:

N is the number of identified corners (4 in the described example);

$C_i$ comprises the corner coordinates of the $i^{th}$ corner;

$R_j$ comprises a variable representing the coordinates of the $j^{th}$ reference position;

$d_{ij}$ comprises the measured reference-to-corner distance between the $j^{th}$ reference position and the $i^{th}$ corner;

the operator $\| \ \|_{L1}$ indicates an $L_1$ norm; and the operator $\| \ \|_{L2}$ indicates an $L_2$ norm.

If vertical coordinates of the reference positions are known from measurements performed in the action 308, such coordinates may be used as constraints on $R_j$.

This calculation is repeated for each of the reference positions to obtain the corresponding position coordinates $R_1$, $R_2$, and $R_3$.

The function may be minimized using non-linear optimization techniques. One approach is to perform a grid search over the possible coordinates of the targets. The value of the function is calculated over a uniform grid of room coordinates and the coordinates with the minimal function value are selected. A second approach is to express the optimization as the task of minimizing a linear objective function under quadratic constraints. Techniques such as sequential least squares programming may be employed for performing this optimization.

Subsequent to performing the actions 306, an action or set of actions 318 are performed for each of the items of interest D. The actions 318 will be described as being performed with respect to the $k^{th}$ item $D_k$.

An action 320 comprises measuring the height of the item $D_k$ with respect to the ceiling of the room 102, or measuring the distance of the item $D_k$ from the ceiling. This may be performed by placing the laser measuring device at or on the item and aiming the laser measuring device at the ceiling. Although actual measurements of the vertical coordinates of the items may improve accuracy, the vertical coordinates may alternatively be estimated or calculated in accordance with the action 322, below.

An action 322 comprises calculating coordinates of the item $D_k$ based on the measurements completed in the actions 306. In certain embodiments, this may be performed by minimizing a second function of the coordinates of the multiple reference positions R and the reference-to-item distances $g_{jk}$. More specifically, the action 322 may be performed by finding a coordinate vector $D_k$ that minimizes the following function:

$$\sum_{j=1}^{M} \| \|R_j - D_k\|_{L2}^2 - g_{jk}^2 \|_{L1}$$

where:

M is the number of reference positions (3 in the described example);

$R_j$ comprises the reference coordinates of the $j^{th}$ reference position;

$D_k$ comprises a variable representing the coordinates of the $k^{th}$ item;

$g_{jk}$ comprises the measured reference-to-item distance between the $j^{th}$ reference position and the $k^{th}$ item;

the operator $\| \ \|_{L1}$ indicates an $L_1$ norm; and the operator $\| \ \|_{L2}$ indicates an $L_2$ norm.

If vertical coordinates of the items are known from measurements performed in the action 320, such coordinates may be used as constraints on $D_k$.

This calculation is repeated for each item $D_k$ to obtain x, y, z coordinates for every item of interest within the room.

In some situations, physical measurements of the distances between items may be made in order to validate the results of the above calculations.

In some situations, positions of items may be determined from only a single reference location. For example, a measuring tool may be placed at a selected reference location and measurements may be taken with respect to each item to obtain the coordinates of the item with respect to the reference location. The measured coordinates for an individual item may include distance from the reference location, the angle of a line from the reference point to the item with respect to a horizontal plane, and the angle of a line from the reference point to the item with respect to a vertical plane. The coordinates of each item are then converted to a Cartesian system using the reference location as a coordinate origin.

The described techniques allow technicians to perform measurements efficiently and accurately, using commonly available equipment, to document the three-dimensional positions of items relative to a room in which the items are located. The techniques are also easily integrated into documentation procedures that may be used again and again for rooms having different configurations.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method of obtaining coordinates of an item within a room, the method comprising:

placing a laser measuring device at a first reference position within the room, wherein the laser measuring device is capable of being aimed in different directions to measure distances from the first reference position to respective surfaces at which the laser measuring device is aimed;

aiming the laser measuring device at a first corner of the room and measuring a first reference-to-corner distance between the first reference position and the first corner with the laser measuring device;

aiming the laser measuring device at a second corner of the room and measuring a second reference-to-corner distance between the first reference position and the second corner with the laser measuring device;

determining coordinates of the first reference position by minimizing a first function of the first reference-to-corner distance and the second reference-to-corner distance;

aiming the laser measuring device at the item and measuring a first reference-to-item distance between the first reference position and the item with the laser measuring device;

placing the laser measuring device at second reference position within the room;

aiming the laser measuring device at the first corner within the room and measuring a third reference-to-corner distance between the second reference position and the first corner with the laser measuring device;

aiming the laser measuring device at the second corner and measuring a fourth reference-to-corner distance between the second reference position and the second corner with the laser measuring device;

determining coordinates of the second reference position by minimizing the first function of the third reference-to-corner distance and the fourth reference to corner distance;

aiming the laser measuring device at the item and measuring a second reference-to-item distance between the second reference position and the item with the laser measuring device; and determining coordinates of the item by minimizing a second function of the coordinates of the first reference position and the second reference position and the first reference-to-item distance and the second reference-to-item distance.

2. The method of claim 1, wherein the first function comprises:

$$\sum_{i=1}^{N} \|\|C_i - R_j\|_{L2}^2 - d_{ij}^2\|_{L1}$$

where:
N is a number of selected corners;
$C_i$ comprises coordinates of an $i^{th}$ corner;
$R_j$ comprises a variable representing the coordinates of a $j^{th}$ reference position; and
$d_{ij}$ comprises a measured reference-to-corner distance between the $j^{th}$ reference position and the $i^{th}$ corner.

3. The method of claim 1, wherein the second function comprises:

$$\sum_{j=1}^{M} \|\|R_j - D\|_{L2}^2 - g_j^2\|_{L1}$$

where:
M is a number of reference positions;
$R_j$ comprises the coordinates of $j^{th}$ reference position;
D comprises a variable representing the coordinates of the item; and
$g_j$ comprises a measured reference-to-item distance between the $j^{th}$ reference position and the item.

4. The method of claim 1, further comprising:
aiming the laser measuring device at a ceiling and measuring a reference-to-ceiling distance between the reference position and the ceiling with the laser measuring device; and
wherein the first function is a function of the measured reference-to-ceiling distance.

5. The method of claim 1, further comprising:
placing the laser measuring device at the item;
aiming the laser measuring device at a ceiling and measuring an item-to-ceiling distance between the item and the ceiling with the laser measuring device; and
wherein the second function is a function of the measured item-to-ceiling distance.

6. A method comprising:
selecting a first reference position and a second reference position within an environment;
measuring a first reference-to-landmark distance between the first reference position and a first landmark and measuring a second reference-to-landmark distance between the second reference position and the first landmark;
measuring a third reference-to-landmark distance between the first reference position and a second landmark and measuring a fourth reference-to-landmark distance between the second reference position and the second landmark;
determining first coordinates of the first reference position and second coordinates of the second reference position based at least in part on one or more of the first reference-to-landmark distance, the second reference-to-landmark distance, the third reference-to-landmark distance, or the fourth reference-to-landmark distance;
for one or more of the first reference position or the second reference position, measuring one or more reference-to-target distance between one or more of the first reference position or the second reference position and a target within the environment; and
determining coordinates of the target based at least in part on one or more of the first coordinates or second coordinates and the one or more reference-to-target distances.

7. The method of claim 6, further comprising specifying one of the first landmark or the second landmark as a coordinate origin, wherein the coordinates of the first reference position and the second reference position and the coordinates of the target are determined relative to the coordinate origin.

8. The method of claim 6, wherein the first landmark and the second landmark comprise corners of a room.

9. The method of claim 6, further comprising placing a laser measuring device at one or more of the first reference position or the second reference position.

10. The method of claim 6, wherein determining the first coordinates of the first reference position comprises minimizing the following function:

$$\sum_{i=1}^{N} \|\|C_i - R_j\|_{L2}^2 - d_{ij}^2\|_{L1}$$

where:
N is a number of landmarks;
$C_i$ comprises coordinates of a $i^{th}$ landmark;
$R_j$ comprises a variable representing coordinates of a $j^{th}$ reference position; and
$d_{ij}$ comprises a measured reference-to-landmark distance between the $j^{th}$ reference position and the $i^{th}$ landmark.

11. The method of claim 6, wherein determining the coordinates of the target comprises minimizing the following function:

$$\sum_{j=1}^{M} ||\,||R_j - D||_{L2}^2 - g_j^2\,||_{L1}$$

where:
- M is a number of reference positions;
- $R_j$ comprises coordinates of a $j^{th}$ reference position;
- D comprises a variable representing the coordinates of the target; and
- $g_j$ comprises the measured reference-to-target distance between the $j^{th}$ reference position and the target.

12. The method of claim 6, further comprising, for the first reference position:
- measuring a vertical position of the first reference position; and
- wherein determining the coordinates of the first reference position is further based at least in part on the measured vertical position.

13. The method of claim 6, further comprising, for the target:
- measuring a vertical position of the target; and
- wherein determining the coordinates of the target is further based at least in part on the measured vertical position.

14. A method, comprising:
- for a first landmark and a second landmark of an environment, measuring a first reference-to-landmark distance between a reference position and the first landmark and measuring a second reference-to-landmark distance between the reference position and the second landmark;
- determining coordinates of the reference position based at least in part on the first reference-to-landmark distance and the second reference-to-landmark distance;
- measuring a reference-to-item distance between the reference position and an item; and
- determining coordinates of the item based at least in part on the coordinates of the reference position and the reference-to-item distance between the item and the reference position.

15. The method of claim 14, further comprising specifying one of the room landmarks as a coordinate origin, wherein the coordinates of the reference position and the coordinates of the item are determined relative to the coordinate origin.

16. The method of claim 14, further comprising measuring a height of the item and a height of the reference position, and wherein determining the coordinates of the reference position is further based at least in part on the height of the reference position, and wherein determining the coordinates of the item is further based at least in part on the height of the item.

17. The method of claim 14, wherein determining the coordinates of the reference position comprises minimizing the following function:

$$\sum_{i=1}^{N} ||\,||C_i - R||_{L2}^2 - d_i^2\,||_{L1}$$

where:
- N is a number of identified landmarks;
- $C_i$ comprises coordinates of an $i^{th}$ landmark;
- R comprises a variable representing the coordinates of the reference position; and
- $d_i$ comprises a measured reference-to-landmark distance between the reference position and the $i^{th}$ landmark.

18. The method of claim 14, wherein determining the coordinates of the item comprises minimizing the following function:

$$||R-D||_{L2}^2 - g^2$$

where:
- R comprises the coordinates of the reference position;
- D comprises a variable representing the coordinates of the item; and
- g comprises the measured reference-to-item distance between the reference position and the item.

19. The method of claim 14, further comprising:
- measuring a vertical position of the reference position;
- wherein determining the coordinates of the reference position is further based at least in part on the measured vertical position.

20. The method of claim 14, further comprising, for the item:
- measuring a vertical position of the item;
- wherein determining the coordinates of the item is further based at least in part on the measured vertical position.

* * * * *